United States Patent
Shen

(10) Patent No.: US 6,176,257 B1
(45) Date of Patent: Jan. 23, 2001

(54) REGULATED AIR SUCTION VALVE

(76) Inventor: Der-Fan Shen, 5F, NO. 40, Fentzu Wei Chieh, Shan-Chung City, Taipei Hsien (TW)

(*) Notice: Under 35 U.S.C. 154(b), the term of this patent shall be extended for 0 days.

(21) Appl. No.: 09/326,488

(22) Filed: Jun. 4, 1999

(51) Int. Cl.[7] .................................................. F16K 24/00
(52) U.S. Cl. ................................. 137/513.5; 137/565.34; 137/614.2; 137/895
(58) Field of Search .................................. 137/888, 889, 137/890, 895, 614.2, 565.18, 565.17, 565.34, 513.5, 565.15

(56) References Cited

U.S. PATENT DOCUMENTS

| | | | |
|---|---|---|---|
| 2,592,884 | * | 4/1952 | Fox et al. . |
| 2,990,778 | * | 7/1961 | Deters ............................ 137/565.17 |
| 4,368,757 | * | 1/1983 | Finger .................................. 137/565 |
| 5,323,809 | * | 6/1994 | Tischer et al. ................. 137/513.5 X |
| 5,427,151 | * | 6/1995 | Pauley .................................. 137/895 |

\* cited by examiner

Primary Examiner—Stephen M. Hepperle
(74) Attorney, Agent, or Firm—Pro-Techtor International Services

(57) ABSTRACT

A regulated air suction valve, used in conjunction with a water pump with a water inlet pipe and a water outlet pipe and a container with an air volume, installed at the water inlet pipe for replenishing the air volume and comprising: a main body, having a submerged end which reaches into the water inlet pipe and a free end; a chamber inside the main body, leading air from the free end to the submerged end; and inlet control valve, located in the chamber at the free end for letting a limited amount of air into the chamber and; a first one-way valve located in the chamber at the submerged end, allowing air to proceed from the chamber into the water inlet pipe, while blocking water from the water inlet pipe from entering the chamber. When the water pump is switched on, underpressure in the water inlet pipe causes air from the chamber to be sucked in, with the inlet control valve allowing only a limited quantity of air to enter the water inlet pipe, such that the water pump is not made ineffective by excessive air.

8 Claims, 6 Drawing Sheets

REGULATED AIR SUCTION VALVE

BACKGROUND OF THE INVENTION

1. Field of the Invention

The present invention relates to a regulated air suction valve, particularly to a regulated air suction valve for use in conjunction with a container without diaphragm for replenishing an air volume.

2. Description of Related Art

High rise buildings and large blocks require a stable water supply without large pressure variations. For this purpose, stable water pressure has to maintained in water delivery pipes in buildings. This is done by water pumps with pressure compensation, i.e., water pumps switching on and off for constant pressure.

A water pump with pressure compensation has a container, connected with the water delivery pipe. When pressure from the water pump rises, the container takes in water, and upon falling pressure the container releases water. Thus a fall in water pressure is attenuated, and there is less need for the water pump to switch on and off frequently, reducing wear on the water pump.

Containers for conventional water pumps with pressure compensation either are containers with diaphragm or containers without diaphragm. A container with diaphragm has an air chamber sealed by a diaphragm and containing pressurized air. Water entering the container pushes up the diaphragm, compressing the air in the air chamber and storing pressure. However, the diaphragm has limited elasticity, limiting the compression of the air in the air chamber and the pressure storing capacity. Therefore pressure changes from switching on and off the water pump are not attenuated effectively, and energy is wasted. Furthermore, due to leaking, pressurized air in the air chamber needs to be refilled from time to time, increasing maintenance cost.

A container without diaphragm has an amount of air which is directly compressed by incoming water. Elasticity of the air stores pressure to a high degree, without limitations by a diaphragm. However, since no diaphragm separates the air from water, a small quantity of air is taken along with water flowing out, reducing the overall amount of air and limiting the pressure storing capacity thereof. To refill air in the container, maintenance personnel first has to empty the container from water, which awkwardly is spilled on the ground.

To summarize, containers without diaphragm have a good pressure storage capacity, ensuring a smooth water supply with stable pressure, but the pressure storage capacity thereof deteriorates during prolonged use due to escaping of air, with no way of refilling on one's own.

A direct way to resolve the problem of deteriorating pressure storage capacity is to install an air suction valve on the water delivery pipe. When the water pump is switched on, air from outside is sucked into the water delivery pipe and subsequently taken along with water into the container. The air is buoyed above water level, joining air already in the container and replenishing the amount of air therein. However, permanent taking in of air into the water delivery pipe leads air to blades of the water pump, impairing the ability thereof to draw water. A conventional suction valve therefore does not solve the problem of deteriorating pressure storage capacity of containers without diaphragm.

SUMMARY OF THE INVENTION

It is therefore the main object of the present invention to provide a regulated air suction valve, which allows to refill air in a container without diaphragm, maintaining the pressure storage capacity thereof.

Another object of the present invention is to provide a regulated air suction valve, which keeps low the amount of air in the water delivery pipe and prevents the water pump from becoming ineffective by air.

The present invention can be more fully understood by reference to the following description and accompanying drawings.

DETAILED DESCRIPTION OF THE PREFERRED EMBODIMENTS

Figure 1:
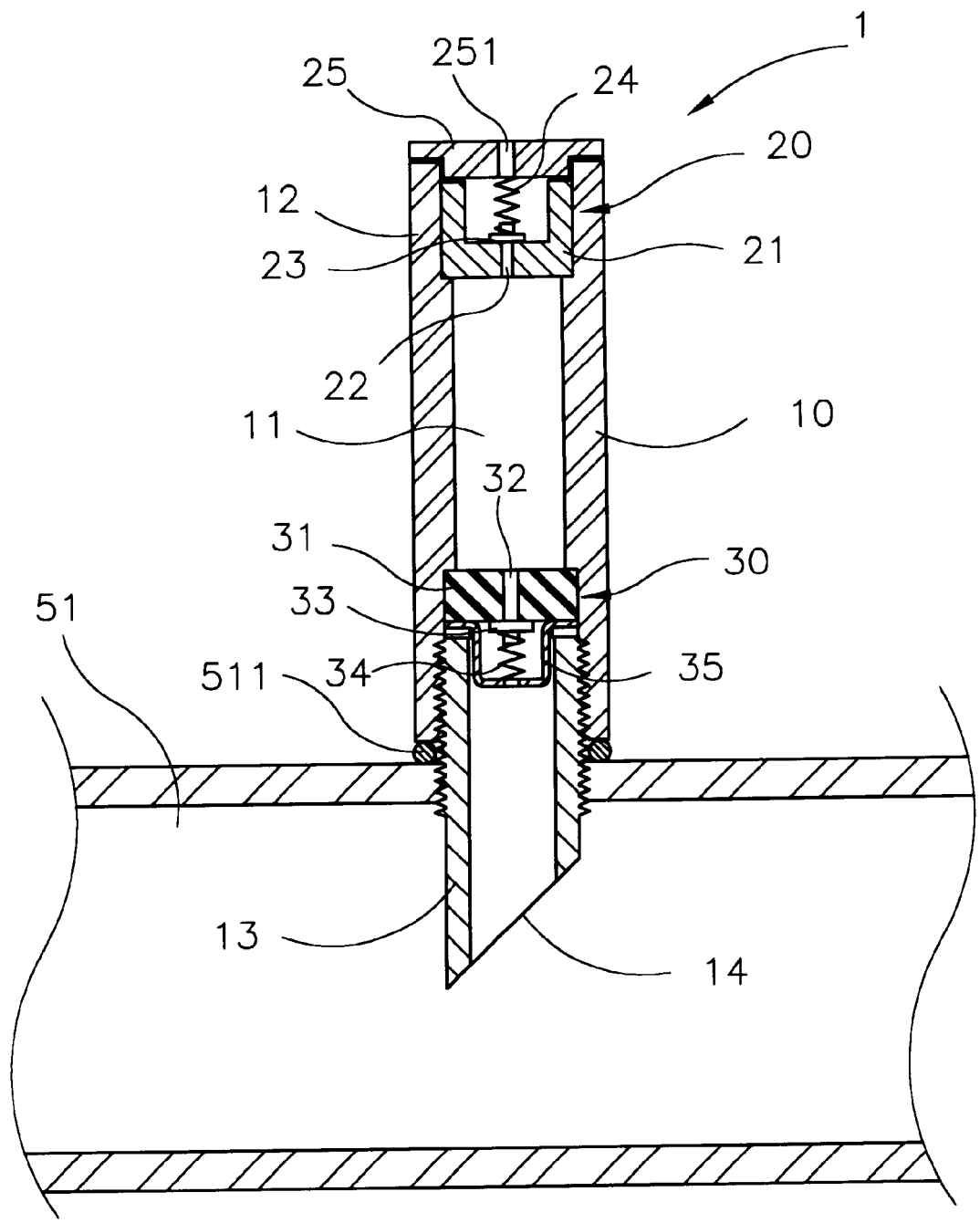
FIG. 1 is a sectional view of the regulated air suction valve of the present invention in the first embodiment, when assembled.

As shown in FIGS. 1–4, the regulated air suction valve 1 of the present invention is used in conjunction with a water pump 50 with a water inlet pipe 51 and a water outlet pipe 52, and a container 60 with an air volume 61. The regulated air suction valve 1 is installed at the water inlet pipe 51. The regulated air suction valve 1 of the present invention in a first embodiment comprises: a main body 10; an air inlet control valve 20; and a first one-way valve 30. The main body 10 is shaped like a tube, having a lower end. A submerged part 13, located inside the water inlet pipe 51, is connected to the lower end of the main body 10. The main body 10 further has a free end 12 outside the water inlet pipe 51. Air is let in through the free end 12. A chamber 11 connects the submerged and free ends 13, 12. The air inlet control valve 20 is mounted in the chamber 11, close to the free end 12, throttling air flowing into the chamber 11. The air inlet control valve 20 has a valve case 21, an outlet hole 22, a throttle element 23, a spring 24, and a top 25. The first one-way valve 30 is mounted in the chamber 11, close to the submerged part 13, allowing air to flow from the chamber 11 into the water inlet pipe 51, but preventing water from flowing back from the water inlet pipe 51 into the chamber 11.

The submerged part 13 is connected by a threaded outer periphery to the lower end of the main body 10 and has an upper end, which supports the first one-way valve 30.

Figure 3:
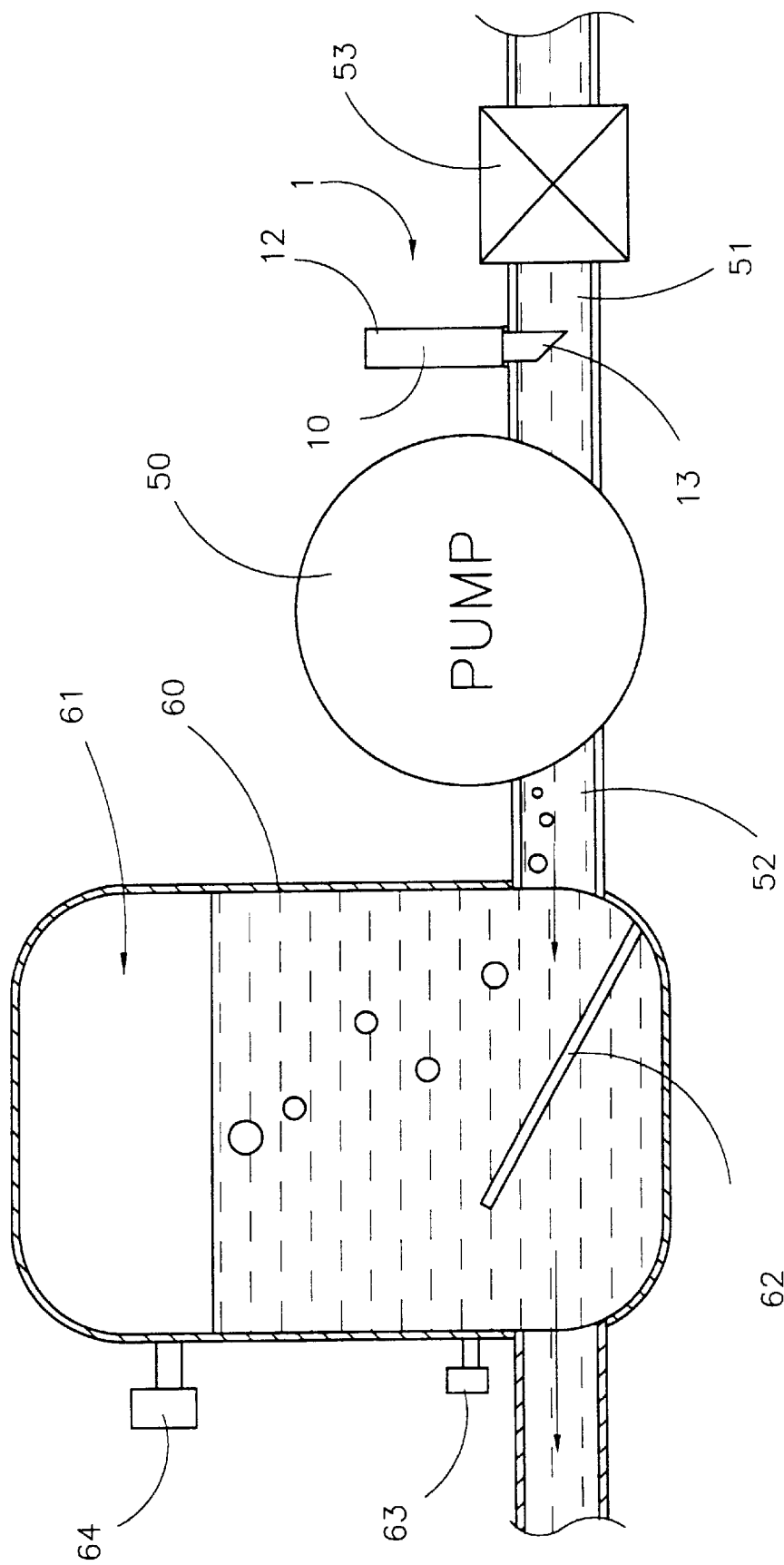
FIG. 3 is a side view of the regulated air suction valve of the present invention in the first embodiment, when installed in conjunction with a container without diaphragm.

As shown in FIG. 3, when the water pump 50 is switched on, pressure in the water inlet pipe 51 is reduced, and air is sucked from the chamber 11 into the water inlet pipe 51, passing through the water pump 50 and the water outlet pipe 52, reaching the container 60 and rising there to the air volume 61, replenishing the amount of air therein. At the same time, underpressure in the chamber 11 causes the throttle element 23 to be pressed against the valve case 21, throttling the air inlet control valve 20. Thus an excessive amount of air will not enter the water inlet tube 51 and make the water pump 50 ineffective.

Referring to FIG. 1, the submerged part 13 reaches into the water inlet pipe 51, the threaded outer periphery passing through a threaded hole thereof and sealed by a sealing ring 511. The submerged part 13 has a lower end at an angle 14 with the orientation of the water inlet pipe 51. As shown in FIG. 3, the angle 14 keeps dynamic water pressure resulting from water flow in the water inlet pipe 51 away from the submerged part 13, allowing an underpressure to develop therein.

The air inlet control valve 20 is mounted at the free end 12, with the valve case 21 located inside the chamber 11 and the outlet hole 22 connecting to the chamber 11. Air entering the chamber 11 passes through the air inlet control valve 20. The throttle element 23 covers the outlet hole 22 from inside the valve case 21. When air is sucked from the chamber 11 into the water inlet pipe 51, underpressure develops in the chamber 11, causing the throttle element 23 to be pressed on the outlet hole 22, throttling the air inlet control valve 20 and reducing air flow into the water inlet pipe 51. The valve case 21 and the throttle element 23 are preferably made of hard plastics, which does not seal tightly and allows a small amount of air still to pass through the outlet hole 22 when the throttle element 23 is pressed on the outlet hole 22.

The spring 24 keeps the throttle element 23 on the outlet hole 22. The spring 24 is fastened to the top 25 and thus positioned. A hole 251 in the top 25 allows air from outside to enter the valve case 21.

The function of the air inlet control valve 20 is to limit the amount of air sucked into the water inlet pipe 51 by water flow therein. Hence the water pump 50 will not become ineffective by excessive air.

The first one-way valve 30 separates air in the chamber 11 from air in the water inlet pipe 51 and comprises: a valve plate 31 with an upper side facing the chamber 11 and a lower side facing the water inlet pipe 51; an hole 32 in the valve plate 31, allowing air from the chamber 11 to pass through the valve plate 31; and a sealing element 33, covering the hole 32 from the lower side of the valve plate 31. The sealing element 33 seals the hole 32 when air pressure on the lower side of the valve plate 31 exceeds that on the upper side thereof. On the other hand, as shown in FIG. 2, when air pressure on the upper side of the valve plate 31 exceeds that on the lower side thereof, the sealing element 33 is lifted, and air is allowed to pass and to flow towards the water inlet pipe 51.

Figure 2:
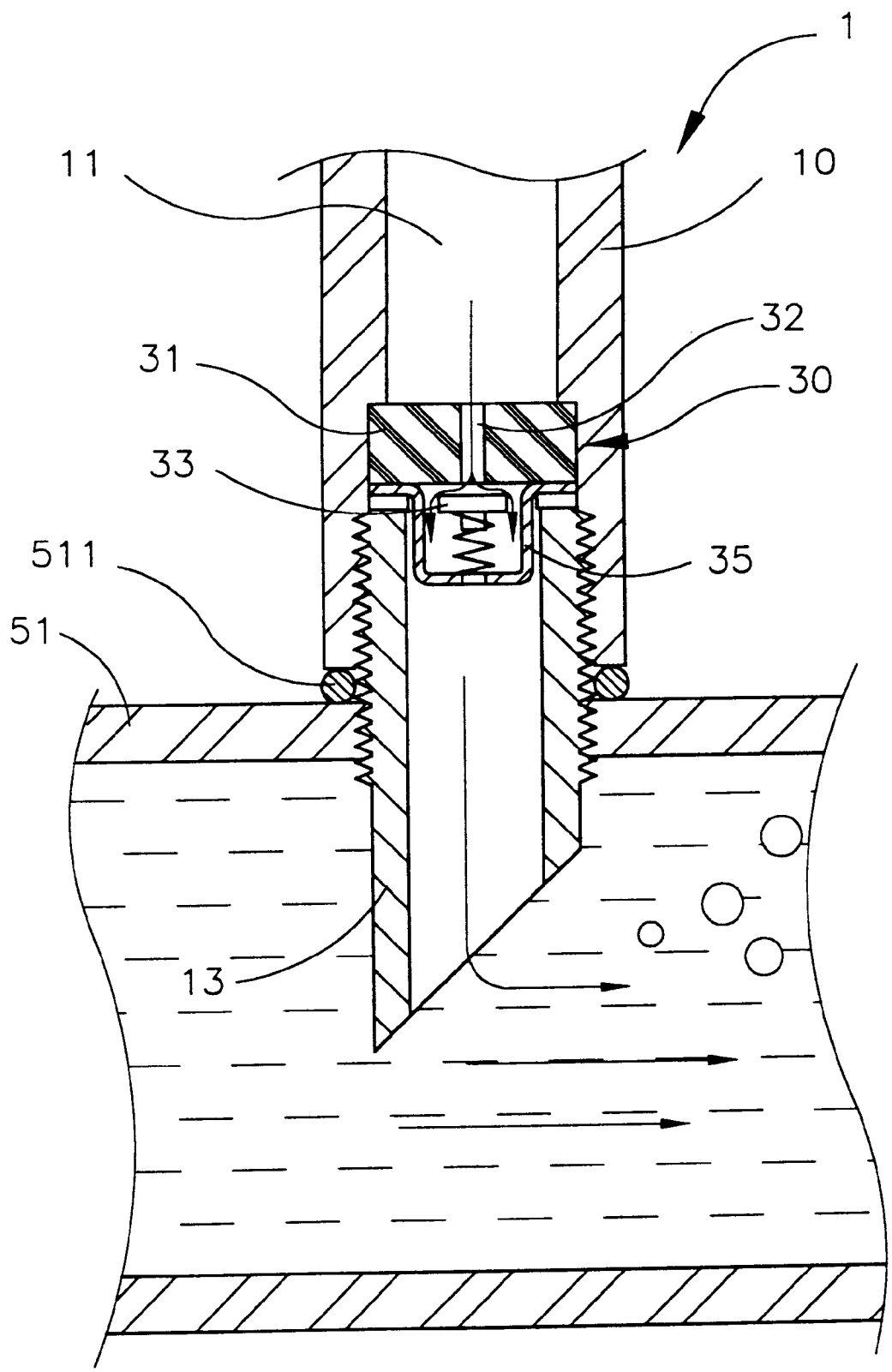
FIG. 2 is a schematic illustration of the movement of the present invention in the first embodiment.

Referring to FIG. 2, when the water pump 50 is switched on, pressure in the water inlet pipe 51 is lowered below air pressure in the chamber 11. Then the sealing element 33 separates from the hole 32 and air from the chamber 11 flows into the water inlet pipe 51. On the other hand, when the water pump 50 is switched off, pressure in the water inlet pipe 51 exceeds air pressure in the chamber 11, pushing the sealing element 33 towards the valve plate 31, sealing the hole 32, and no water from the water inlet pipe 51 is able to enter the chamber 11.

In some arrangements, water flowing to the water pump 50 comes from a water source at a higher position than the water pump 50. Then, after switching on the water pump 50, there will be still an unreduced pressure in the water inlet tube 51. Under these circumstances a control valve 53 has to be installed in front of the regulated air suction valve 1 to match the water flow in the water inlet pipe 51 with that in the water outlet pipe 52 and to allow for underpressure to develop in the water inlet pipe 51 after the water pump 50 has been switched on.

Referring again to FIG. 3, the regulated air suction valve of the present invention is installed in the water inlet pipe 51 close to the water pump 50 or directly at the water pump 50. The water pump 50 transports air that has entered the water inlet tube 51 to the container 60. The container 60 has a water entrance and a guiding plate 62 with a height roughly equal to the height of the water entrance. The guiding plate 62 is mounted at an angle that deflects incoming water upward, easing an upward flow of enclosed air towards the air volume 61. The container 60 further has a one-way air outlet valve 63 to release air from the container 60, while blocking water from flowing out. If the container 60 contains too much air, having too low a water level, the air outlet valve allows to release excess air from the container 60. Thus damages caused by air in the water supply, e.g., exploding heaters, are prevented.

Figure 4:
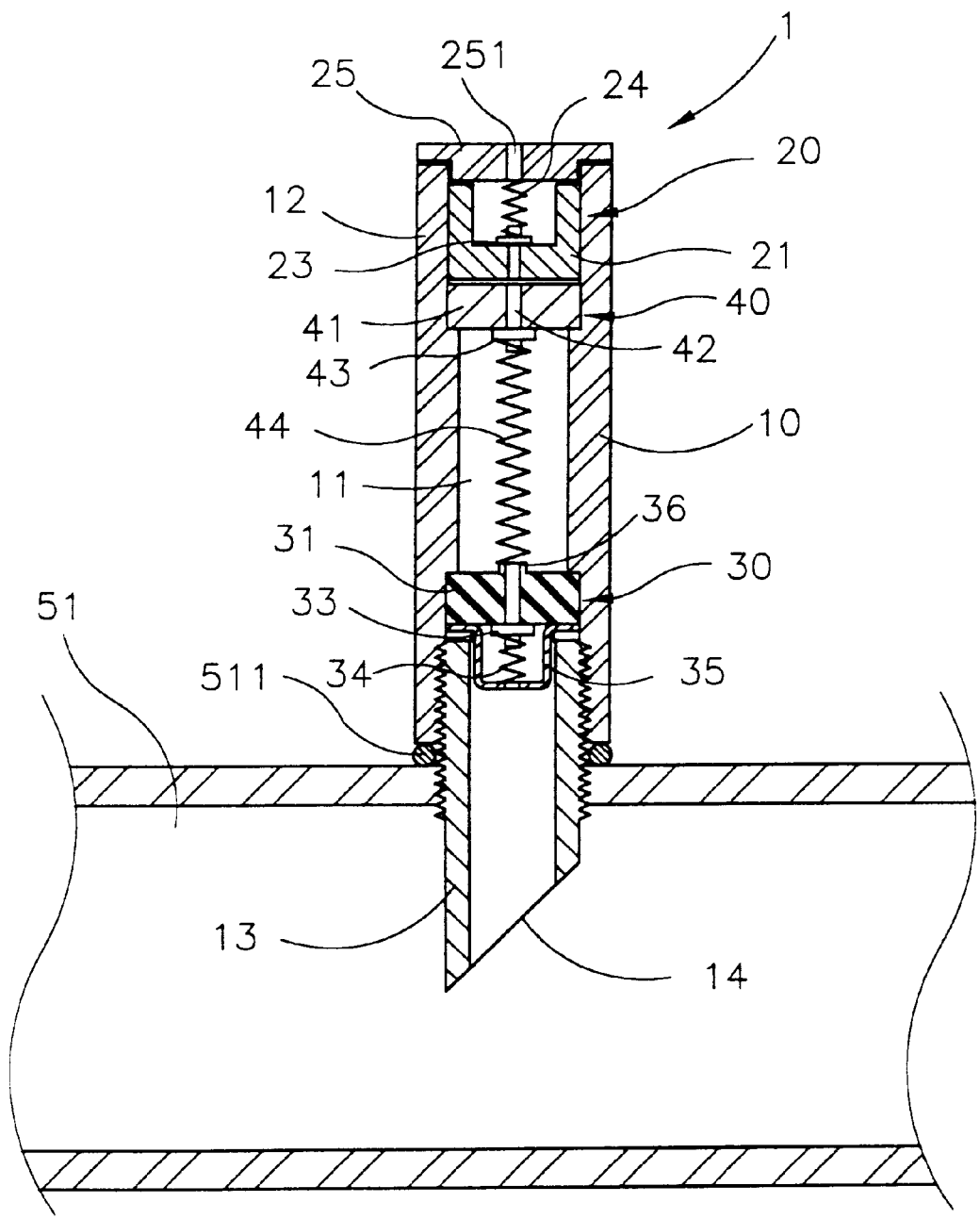
FIG. 4 is a sectional view of the regulated air suction valve of the present invention in the second embodiment.

Referring to FIG. 4, the present invention in a second embodiment has a second one-way valve 40, locate between the first one-way valve 30 and the inlet control valve 20. The second one-way valve 40 allows any flow to proceed only from the free end 12 to the submerged end 13, preventing water from the water inlet tube 51 to escape to the outside.

The second one-way valve 40 comprises: a valve plate 41 with an upper side facing the inlet control valve 20 and a lower side facing the first one-way valve 30; an hole 42 in the valve plate 41, allowing air to pass through the valve plate 41; and a sealing element 43, covering the hole 42 from the lower side of the valve plate 41. The sealing element 43 allows air only to pass from the upper side of the valve plate 41 to the lower side thereof, but not vice versa. A spring 44 is inserted between the sealing element 43 and the first one-way valve 30, having an upper end attached to the sealing element 43 and a lower end that is attached to a fixing element 36. The spring 44 presses the sealing element 43 on the hole 42.

The second one-way valve 40 prevents any small amount of water which has leaked into the chamber 11 through the first one-way valve 30 from proceeding further to the free end 12, resulting in an improved sealing effect.

Figure 5:
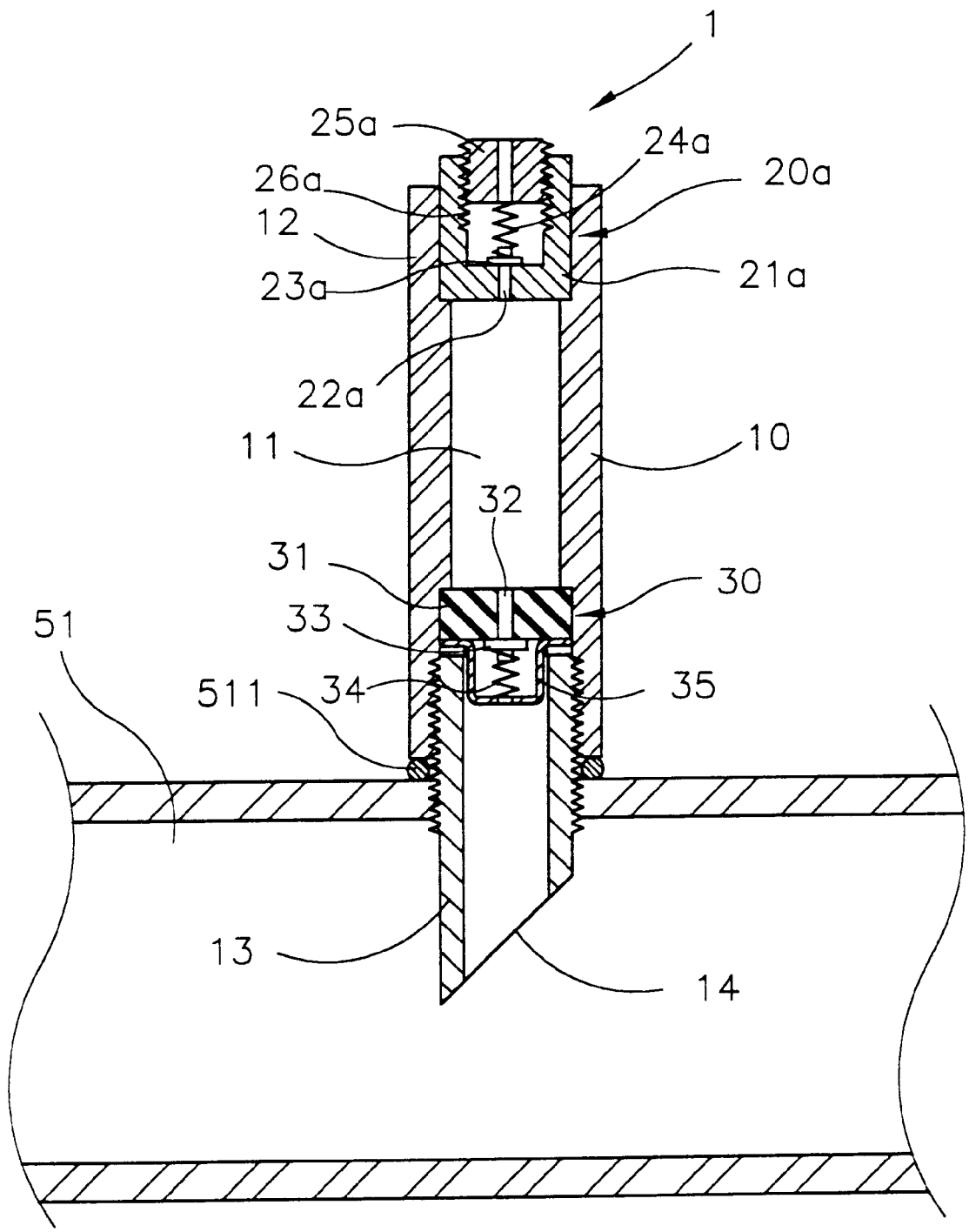
FIG. 5 is a sectional view of the regulated air suction valve of the present invention in the third embodiment.

Referring to FIG. 5, the present invention in a third embodiment has an inlet control valve 20*a* with a valve case 21*a*, an outlet hole 22*a*, a throttle element 23*a*, a spring 24*a*, and a top 25*a*. The spring 24*a* holds the throttle element 23*a* on the outlet hole 22*a*. The valve case 21*a* has a threaded inner side 26*a*, which engages with the top 25*a*, allowing to vary a vertical position of the top 25*a* by turning the top 25*a*. The spring 24*a* is connected with the top 25*a*. Therefore, turning the top 25*a* controls the pressure of the spring 24*a* on the throttle element 23*a* on the outlet hole 22*a*.

Figure 6:
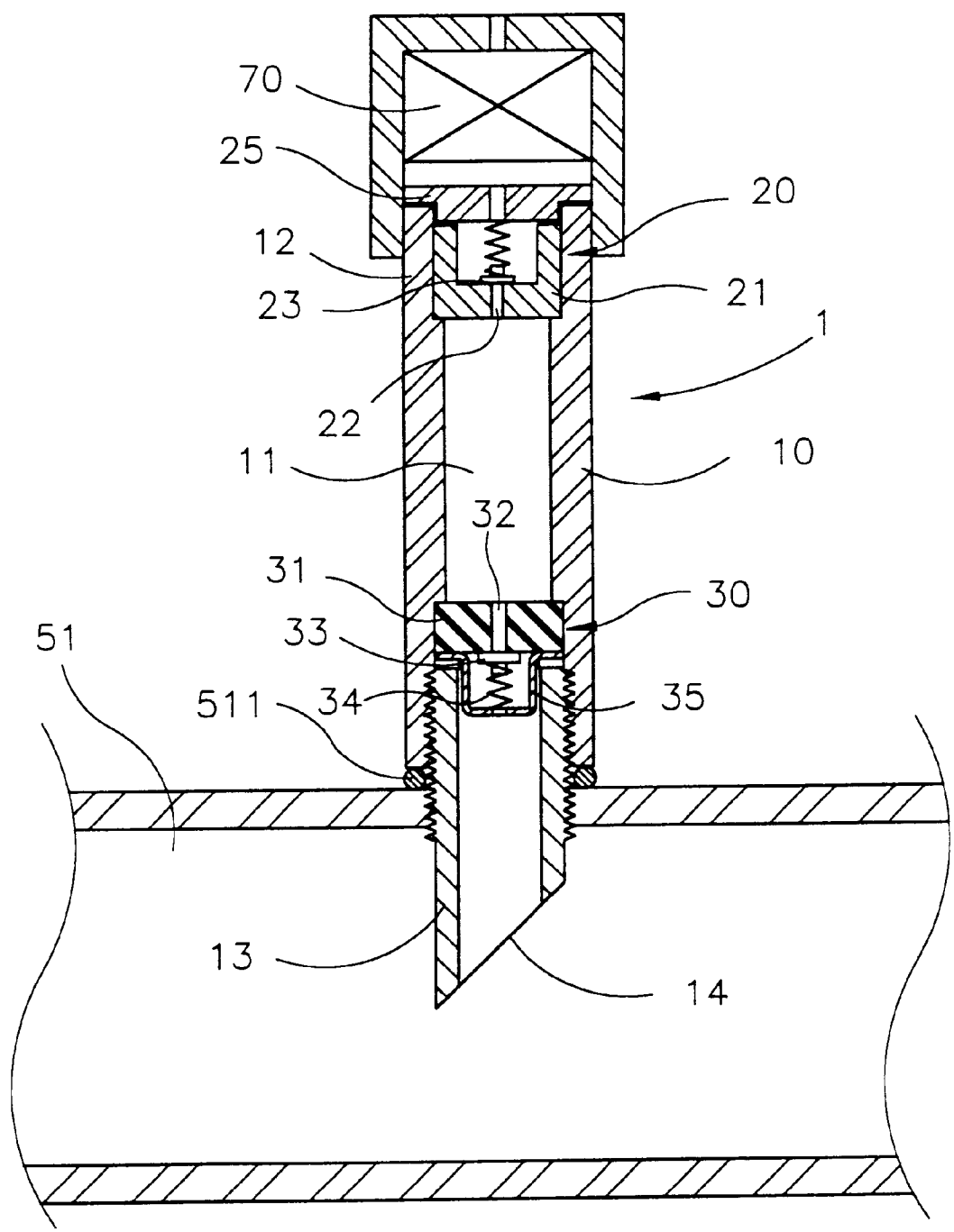
FIG. 6 is a sectional view of the regulated air suction valve of the present invention in the fourth embodiment.

Referring to FIG. 6, the present invention in a fourth embodiment has a magnetic valve 70, located on the main body 10 and controlling the air flow into the chamber 11. Opening the magnetic valve 70 lets air flow into the water inlet pipe 51, closing the magnetic valve 70 blocks air from entering the chamber 11. Therefore, when a sufficient quantity of air fills the air volume 61 inside the container 60, further supply of air is cut by closing the magnetic valve 70. When the air volume 61 in the container 60 drops below a certain level, refilling is done by opening the magnetic valve 70.

The regulated air suction valve of the present invention releases air into the container 60 while the water pump 50 is switched on, compensating loss of air in the container 60. The inlet control valve 20 limits the amount of air entering the water inlet pipe 51, preventing the water pump 50 from becoming ineffective.

While the invention has been described with reference to preferred embodiments thereof, it is to be understood that modifications or variations may be easily made without departing from the spirit of this invention which is defined by the appended claims.

What is claimed is:

1. A regulated air suction valve, used in conjunction with a water pump with a water inlet pipe and a water outlet pipe and a container with an air volume, installed at said water inlet pipe for replenishing said air volume and comprising:

a main body, having a submerged end which reached into said water inlet pipe and a free end;

a chamber inside said main body, leading air from said free end to said submerged end;

an inlet control valve, located in said chamber at said free end for letting a limited amount of air into said chamber and;

a first one-way valve located in said chamber at said submerged end, allowing air to proceed from said chamber into said water inlet pipe, while blocking water from said water inlet pipe from entering said chamber;

wherein, when said water pump is switched on, underpressure in said water inlet pipe causes air from said chamber to be sucked in, with said inlet control valve allowing only a limited quantity of air to enter said water inlet pipe, such that said water pump is not made ineffective by excessive air.

2. A regulated air suction valve according to claim 1, wherein said inlet control valve further comprises:

a valve case, located in said chamber at said free end;

an outlet hole in said valve case, allowing air to flow from said valve case into said chamber and;

a throttle element, covering said outlet hole from inside said valve case, without sealing said outlet hole, such that a small gap is left for air passing through said outlet hole.

3. A regulated air suction valve according to claim 2, wherein said inlet control valve further comprises a spring, which presses on said throttle element, supported by said main body.

4. A regulated air suction valve according to claim 3, wherein said inlet control valve further comprises a control element for controlling an elastic force of said spring.

5. A regulated air suction valve according to claim 4, wherein said control element further comprises a thread on said valve case, with said spring connected to said valve case, wherein by turning said valve case a position thereof is adjusted, controlling said elastic force of said spring.

6. A regulated air suction valve according to claim 1, wherein said first one-way valve further comprises:

a valve plate, having an upper side facing said chamber and a lower side facing said submerged end;

a hole in said valve plate, allowing air to pass from said upper side to said lower side and;

a sealing element, covering said hole from said lower side, sealing said hole when pressure in said water inlet pipe exceeds pressure in said chamber and separating from said hole, allowing air to pass, when pressure in said chamber exceeds pressure in said water inlet pipe.

7. A regulated air suction valve according to claim 1, further comprising a second one-way valve, located between said inlet control valve and said first one-way valve, allowing air to flow from said inlet control valve to said first one-way valve, while blocking a reverse flow.

8. A regulated air suction valve according to claim 7, wherein said second one-way valve further comprises:

a valve plate, located next to said inlet control valve, having an upper side facing said inlet control valve and a lower side facing said first one-way valve;

a hole in said valve plate, allowing air to pass from said upper side to said lower side and;

a sealing element, covering said hole from said lower side, sealing said hole when pressure on said lower side exceeds pressure on said upper side and separating from said hole when pressure on said upper side exceeds pressure on said lower side.

* * * * *